US 8,870,442 B2
Oct. 28, 2014

(12) United States Patent
Sant'Elia

(10) Patent No.: US 8,870,442 B2
(45) Date of Patent: Oct. 28, 2014

(54) PLASTICATING SCREW

(75) Inventor: Francesco Sant'Elia, Varese (IT)

(73) Assignee: M.R.S. Italia S.R.L., Busto Arsizio (IT)

( * ) Notice: Subject to any disclaimer, the term of this patent is extended or adjusted under 35 U.S.C. 154(b) by 822 days.

(21) Appl. No.: 13/115,750

(22) Filed: May 25, 2011

(65) Prior Publication Data
US 2012/0300572 A1 Nov. 29, 2012

(51) Int. Cl.
B29B 7/00 (2006.01)
B29B 7/42 (2006.01)
B29C 47/62 (2006.01)
B29C 47/60 (2006.01)
B29C 47/64 (2006.01)
B29C 47/00 (2006.01)

(52) U.S. Cl.
CPC ............... B29B 7/429 (2013.01); B29C 47/625 (2013.01); B29C 47/6025 (2013.01); B29C 47/64 (2013.01); B29C 47/0009 (2013.01)
USPC .................................. 366/79; 366/88; 366/89

(58) Field of Classification Search
USPC ................................................ 366/79, 88, 89
See application file for complete search history.

(56) References Cited

U.S. PATENT DOCUMENTS

| 2,765,490 | A | | 10/1956 | Zona |
| 3,449,793 | A | | 6/1969 | Weir |
| 3,867,079 | A | * | 2/1975 | Kim .............................. 425/208 |
| 4,341,474 | A | | 7/1982 | Wheeler, Jr. et al. |
| 5,141,326 | A | | 8/1992 | Eshima |
| 6,139,179 | A | | 10/2000 | Christiano et al. |
| 6,176,606 | B1 | | 1/2001 | Christiano et al. |
| 6,752,528 | B1 | | 6/2004 | Durina |
| 2002/0131322 | A1 | | 9/2002 | Grunschloss |

FOREIGN PATENT DOCUMENTS

| DE | 23 52 816 A1 | 4/1975 |
| DE | 199 28 870 A1 | 1/2001 |
| DE | 10 2005 054 265 A1 | 5/2007 |
| GB | 693153 | 6/1953 |
| GB | 1206635 A | 9/1970 |
| WO | 0117749 A1 | 3/2001 |
| WO | 0117751 A1 | 3/2001 |

OTHER PUBLICATIONS

Stenzel, Holger Dr.-Ing., "Grundlagen Zur Verfahrenstechnischen Auslegung Von Barriereschnecken in Glattrohr- Und Nutbuchsenextrudern", Technisch—wissenschafticher Bericht, Technologie der Kunststoffe, Universitaet-Gesamthochschule Paderborn, 1992, 14 pages.

* cited by examiner

Primary Examiner — James Sanders
(74) Attorney, Agent, or Firm — Pearne & Gordon LLP

(57) ABSTRACT

A plastication screw (1) comprises a shank (2) extending along a rectilinear axis (3), a feeding region (4) to supply a product to be plasticated, a plastication region (5) placed immediately downstream of the feeding region (4), relative to a main feeding direction (S) of the product along the axis (3) of the shank (2), at least one primary thread (7) extending in a helical development around the shank (2) at least in the plastication region (5), following a predetermined winding direction (V), and at least one secondary thread (10) extending in a helical development around the shank (2) in the same way as said predetermined winding direction (V), in at least part of the plastication region (5). The primary thread (7) and the secondary thread (10) each have a varying pitch ($p_1$, $p_2$). The pitch variation ($p_2$) of the secondary thread (10) is greater than the pitch variation ($p_1$) of the primary thread (7).

13 Claims, 2 Drawing Sheets

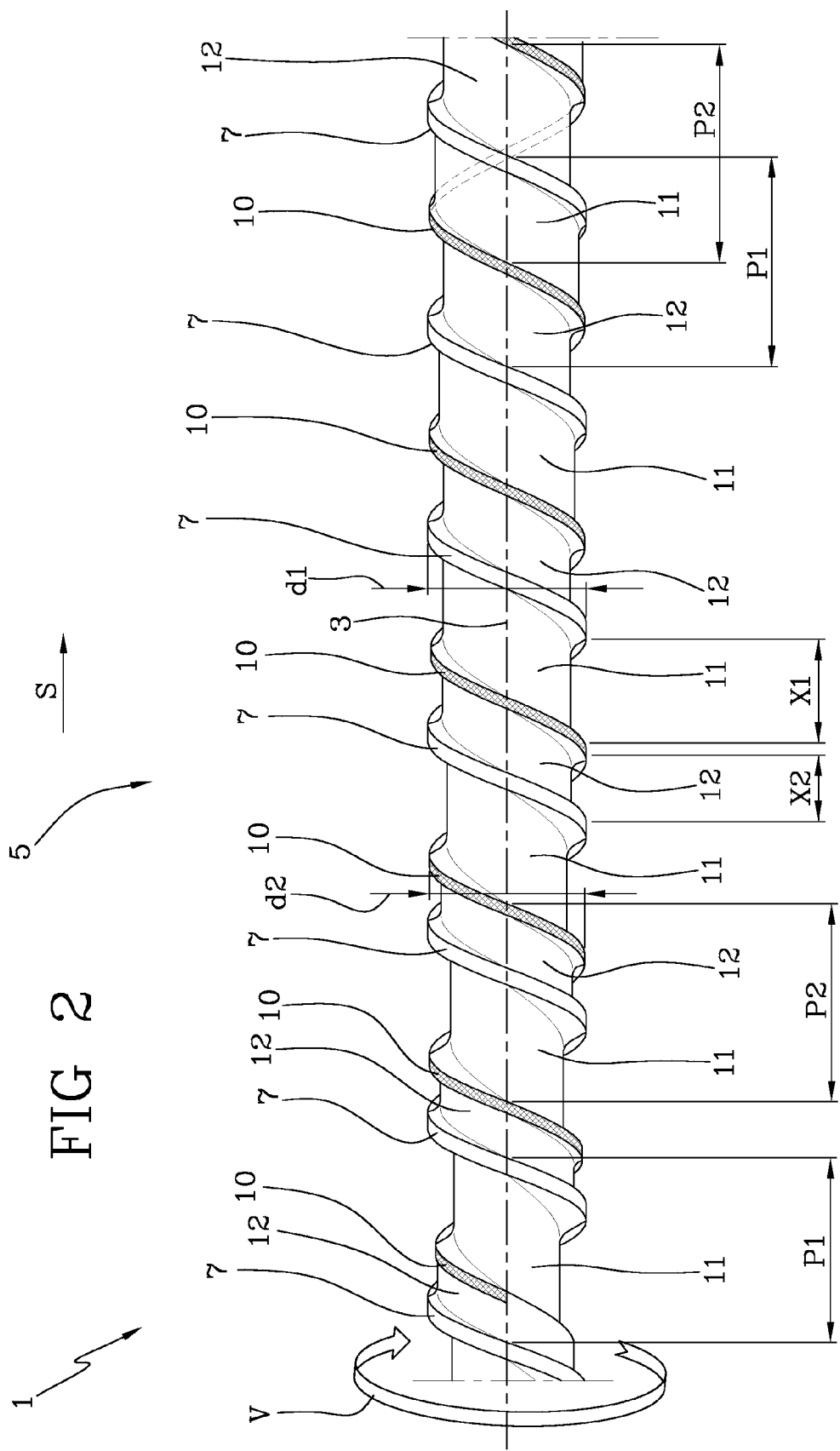

PLASTICATING SCREW

The present invention relates to a plasticating screw, and to a plasticating apparatus incorporating said screw.

It is known that in the field of manufacturing and producing articles of plastic material, plasticators with a rotary screw are used into which plastic material is introduced in a solid granular form so as to obtain a fluid product at the exit which is suitable for subsequent extrusion operations or for injection into suitable forming moulds. Plasticators are made up of a cylindrical body in which a screw, also referred to as Archimedes' screw, is axially inserted which is set in rotation by suitable apparatuses.

The plasticating screws are generally shaped with three regions: a feeding region, placed close to a hopper into which the solid material in a granular form to be plasticated is inserted, an intermediate region referred to as compression region, along which a primary thread extends which is used for compressing the granular product to make it melt, and a final end region named metering region.

The core diameter of the screw thread can vary along the axial extension of said screw, starting from an inlet towards an outlet; in addition, the cylinder walls are provided with suitable heating resistors. The material moving forward in the thread race of the screw is submitted to a temperature and pressure increase, necessary for determining change of the physical properties (solid-liquid).

One of the main problems typical of the plasticating screws of the traditional type is to obtain a sufficient plastication homogeneity of the material, which has repercussions on the final product obtained by extrusion or moulding.

For instance, it is normal that during plastication a temperature variation occurs in the material thickness included between the screw core and the inner wall of the cylinder. To this temperature variation, a variation in the material density corresponds. The density variation of the material, for instance, can cause an unhomogeneous material distribution in the extruded product or in the mould.

In addition, the molecules of the polymers composing each resin tend to remain mutually linked so as to form the so-called "memory lattices" in which the polymer molecules remain mutually bonded giving the compound a lumpy appearance, in which small compact clusters of material dipped in a more fluid stream can be identified.

Finally, when resins of different nature and colour are processed, incomplete blending of same leads to production of articles of manufacture in which regions of different colours are recognisable, due to the predominant presence of one resin relative to another.

To partially solve these problems, plastication screws are known which are provided, at the intermediate plastication region, with a secondary thread, also referred to as barrier thread, associated with the primary thread. The function of this barrier thread is to improve plastication and the material homogeneity, to make temperature uniform and enable temperature distribution, thus facilitating melting of the solid material.

The plastication screws of known type in the plastication region show variations in the geometry of the primary thread and/or the secondary thread and/or the core.

However it has been found that under particular operating conditions, variations in the geometry of the screw primary thread and/or secondary thread and/or core can create some undesirable lack of homogeneity in the processed plastic material. Variations can be more highlighted during working of plastic materials to which coloured masters are added. Due to its own nature, the colour pigment likes best to follow the hottest fused-plastic flow.

In addition, geometric variations in the primary thread and/or secondary thread and/or core can cause undesirable localised temperature increases, which can limit the flowing rate and deteriorate the physical properties of the processed resins, triggering in advance cross-linking phenomena or viscosity and density variations.

Variations in the geometry of the primary thread and/or secondary thread and/or core can create important pressure variations inside the chamber where the plastication screw is working, giving rise to great energy requirements for carrying out the plastication process.

Presently the market is very attentive to energy waste, so that there is a need to create screw profiles capable of limiting energy absorption during the plastication process. The Applicant has therefore found that the plastication and blending level reached by the devices of the known art can be further improved.

It is a technical task of the present invention to make available a plastication screw that is devoid of the above mentioned drawbacks.

Within this technical task, the present invention aims at producing a plastication screw improving the inner homogeneity of the mass being worked, in terms of temperature distribution, density and flowing rate. More particularly, it is an aim of the present invention to propose a plasticating screw allowing an optimal plastication or homogenisation of the material to be obtained without increasing the temperature at localised regions too much.

Finally, another important aim of the invention is to make available a plasticating screw allowing blending/mixing of the product to be improved while maintaining the energy absorption within limits.

The foregoing and further aims that will become more apparent in the course of the present description are substantially achieved by a plasticating screw having the features set out in any independent claim and/or in one or more of the claims depending thereon.

A preferred but not exclusive embodiment of a plasticating screw in accordance with the present invention is now illustrated by way of non-limiting example.

With reference to the accompanying drawings:

FIG. 2 shows a detail to an enlarged scale of the plasticating screw shown in FIG. 1;

Figure 3A:
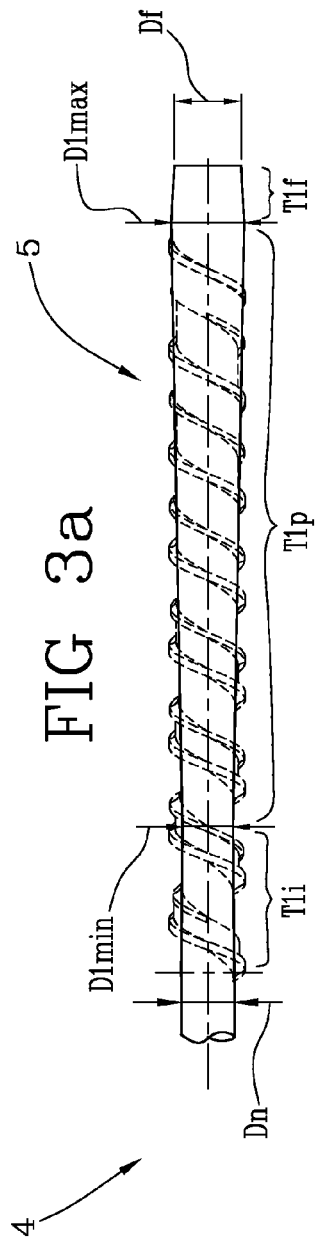
Figure 3B:
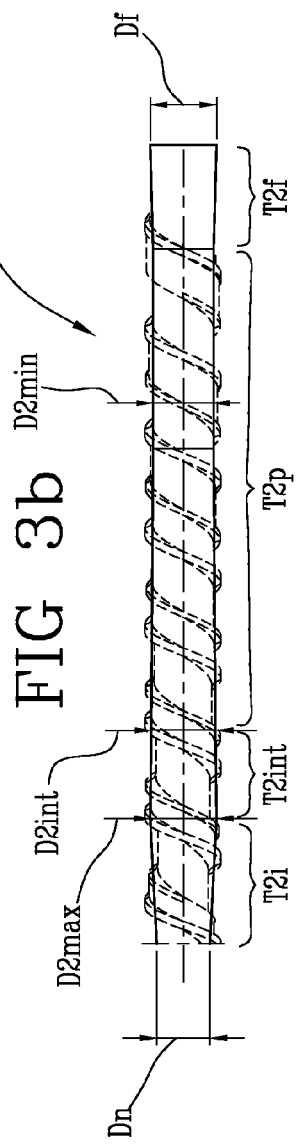

FIG. 3a highlights a diagram indicative of the diameter variation of the plasticating screw core, at a primary flowing channel;

FIG. 3b shows a diagram indicative of the diameter variation of the plasticating screw core, at a secondary flowing channel.

In accordance with the attached drawings, a plasticating apparatus has been generally identified by reference numeral 13; it comprises a tubular body 14 inside which a plasticating screw 1 is rotatably mounted.

Apparatus 1 further comprises driving means 17 to set screw 1 in rotation.

The tubular body 14 has an inlet 15, into which the product to be worked is introduced, and an outlet 16.

Figure 1:
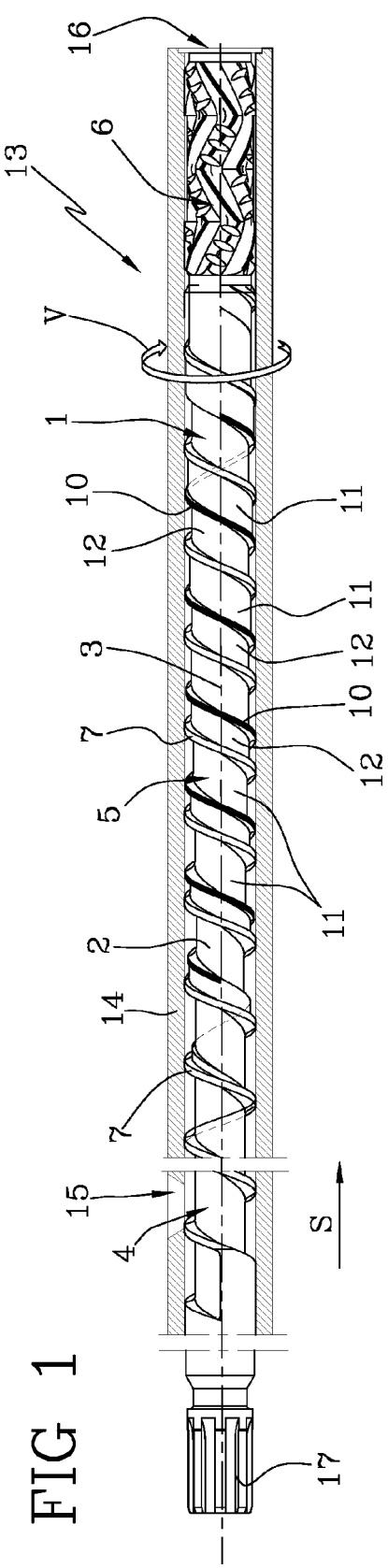
FIG. 1 is a longitudinal partly broken off section view of a plasticating apparatus comprising a plasticating screw.

Referring particularly to FIG. 1, screw 1 comprises a shank 2 extending according to a rectilinear axis 3 and along which it is possible to identify a feeding region 4 at which the solid product to be plasticated is introduced, and a plastication region 5, placed immediately downstream of the feeding region 4, taking into account the main feeding direction S of the product to be worked.

Downstream of the plastication region 5, there is a mixing/blending region 6, inside which mixing of the product to be ejected goes on and is completed.

The product is introduced in the form of solid granules through a hopper, not shown, operating at the inlet 15 of the tubular body 4 and it moves on from the feeding region 4 into the plastication region 5, where it is worked until it takes the consistency of a fused and homogeneous mass.

During working within this region, the product is pushed along the main feeding direction S that is substantially parallel to axis 3 of the screw shank 2.

To this aim, the plasticating screw 1 at least along the whole plastication region 5 has at least one primary thread 7 extending in a helical development around shank 2 according to a predetermined winding direction V and having a ridge diameter $d_1$ substantially equal to the inner diameter of the tubular body 14 of the plasticating apparatus 13.

The primary thread 7 preferably winds up along the whole plastication region 5 and along the feeding region 4.

Shown in FIG. 2 to an enlarged scale is the plastication region 5 alone, also called barrier region.

A secondary thread 10, or barrier thread, is helically wound at least partly around the shank 2 of the plastication region 5, following the same way as the predetermined winding direction V of the primary thread 7.

In particular, the secondary thread 10 is only present in said plastication region 5 or barrier region, and has a ridge diameter $d_2$ preferably smaller than the ridge diameter $d_1$ of the primary thread 7.

The primary thread 7 has a substantially constant pitch within the feeding region 4, while it has a varying pitch $p_1$ in the plastication region 5, or at least in a prevailing portion thereof.

More particularly, in the plastication region 5 the pitch $p_1$ has a preferably increasing value at each turn carried out by the helical development of the primary thread 7 around shank 2, following a predetermined, preferably constant, increase amount, at each turn carried out by its helical development around shank 2.

The secondary thread 10 too has a varying pitch $p_2$ in the plastication region 5, or at least in a prevailing region thereof. More particularly, the pitch $p_2$ of the secondary thread 10 progressively increases from the feeding region 4 according to a predetermined, preferably constant, increase amount, at each turn carried out by its helical development around shank 2.

Advantageously, the increase amount of pitch $p_2$ of the secondary thread 10 is greater than the increase amount of pitch $p_1$ of the primary thread 7. As a result, the measurable distance, downstream of the primary thread 7, between the primary thread and the secondary thread 10, progressively increases along the longitudinal extension of screw 1 away from the feeding region 4.

The pitch increase amount can be expressed in linear terms, and may be included between 1 and 3 mm for example, for each turn carried out by the helical development of the primary thread 7, and included between 1.5 and 4.5 mm for each turn carried out by the helical development of the secondary thread 10. Alternatively, the increase amount can be set out in other terms, such as a percentage included between 2% and 4% of the pitch measurable on the adjacent turn carried out by the helical development of the primary thread 7, and included between 3% and 6% of the pitch measurable on the adjacent turn carried out by the helical development of the secondary thread 10.

The presence of the primary 7 and secondary 10 threads delimits a primary flowing channel 11 around the shank 2 in the plastication region 5, which primary channel is alternated with a secondary flowing channel 12.

In particular, with reference to the feeding direction S of the product along axis 3, the primary flowing channel 11 is confined between the secondary thread 10 and the primary thread 7 respectively placed upstream and downstream of the primary flowing channel. The secondary flowing channel 12 is in turn confined between the primary thread 7 and the secondary thread 10 placed upstream and downstream of the secondary flowing channel, respectively.

The primary flowing channel 11 is also defined "solid channel" while the secondary flowing channel 12 is also defined "liquid channel": this is due to the fact that the product in the form of granules preferably tends to flow within the solid channel and as it melts tends to jump over the secondary thread 10 and move to the inside of the liquid channel 12.

The feeding region 4 only has the primary flowing channel 11 or solid channel, as shown in FIG. 1. The secondary channel 12 or liquid channel, on the contrary, only or mainly extends within the plastication region 5.

As better viewed from FIG. 2, by effect of the above described pitch variations, the axial sizes of the primary channel 11 and the secondary channel 12 progressively and continuously vary along the axis 3 of shank 2.

In particular, the primary flowing channel 11 reduces its axial size, marked by $X_1$ in FIG. 2, while the secondary flowing channel 12 increases its axial size $X_2$ away from the feeding region 4.

Preferably, also the depth of said channels 11 and 12 varies along the direction S. As better shown in FIG. 3a, the outer diameter of shank 2 along the primary flowing channel 11 or solid channel keeps a constant nominal value Dn in the feeding region 4. After a slight reduction, approximately of 5%, until a minimum value $D_1$min in an initial connection length $T_1$i immediately preceding the start of the secondary thread 10, the outer diameter of shank 2 along the primary flowing channel 11 continuously grows until a maximum value $D_1$max, on moving towards the mixing region 6 over a prevailing length $T_1$p in the plastication region 5. The diameter of shank 2 along the primary channel 11 preferably is submitted to a varying increase, from 40% to 45% relative to the nominal value Dn measurable in the feeding region 4. In a final connection length $T_1$f, close to the mixing region 6, shank 2 can have a new diameter reduction, approximately of 10% relative to the maximum diameter $D_1$max reached in the plastication region 5, until a final diameter Df is achieved.

Therefore, in the prevailing length $T_1$p, just as an indication corresponding to at least 60% of the overall axial size of the plastication region 5, the primary flowing channel 11 progressively reduces its depth away from the feeding region 4.

Vice versa, as better shown in FIG. 3b, the outer diameter of shank 2 along the secondary flowing channel 12 or liquid channel tends to keep an almost constant or slightly decreasing value, at least for the prevailing length $T_2$p in the plastication region 5.

In more detail, in the embodiment shown the outer diameter of shank 2 measurable along the secondary flowing channel 12 grows along a short initial connection length $T_2$i, from the nominal value Dn until reaching a maximum value $D_2$max at the start of the secondary thread 10. Starting from the maximum value $D_2$max, the value of the aforesaid diameter sharply decreases to an intermediate value $D_2$int away from the feeding region 4, with a reduction of approximately 10% relative to a $D_2$max along an intermediate connection length $T_2$int having an essentially axial extension equal to the pitch of the secondary thread 10 close to said intermediate connection length $T_2$int.

Along the prevailing length $T_1p$, having an extension that, just as an indication, corresponds to at least 60% of the overall axial extension of the plastication region 5, the diameter reduction of shank 2 along the secondary channel 12 starting from the intermediate value $D_2$int, is of little significance, by way of example not exceeding 10%, until reaching a minimum value $D_2$min. Alternatively, in the prevailing length $T_2p$ the diameter variation can be fully absent. In a final connection length $T_2f$ downstream of the prevailing length $T_1p$, the diameter of shank 2 increases until reaching the final value Df.

In other words, by effect of the above described pitch and diameter variations, in the plastication region 5, away from the feeding region 4, there is a decrease in the cross section of the primary channel 11 together with a corresponding increase in the cross section of the secondary channel 12. This section reduction of the primary channel 11 is correlated with the progressive reduction of the solid part of the product being worked, in the same manner as there is a greater increase in the section of the liquid channel 12, to enable the fused mass to be received in a progressively increasing amount.

In other words, the primary solid channel 11 becomes smaller in width both in terms of true width and of depth, in the same manner as the secondary liquid channel 12 becomes bigger in width in terms of true width and also, to a smaller and even zero extent, of depth.

In addition, the reduction in depth of the solid channel allows the solid product to be constantly compressed against the inner wall of the tubular body 14 of the plasticating apparatus 13, so as to facilitate melting of the product.

The invention offers important advantages and achieves the intended purposes.

The particular geometry of the primary thread 7 and the secondary thread 10 ensures full and gradual melting of the material. In fact, due to the continuous pitch increase of both threads, with a greater increase for the secondary thread, an optimal distribution of volumes in the primary and secondary channels is obtained, while maintaining the diameter of shank 2 at the secondary channel almost constant. In this way, a uniform temperature and density distribution is obtained inside the product, thus improving homogeneity of the all mass being worked.

Therefore, the final product is not submitted to impoverishment due to lack of inner homogeneity and, as a result, the quality of the final product is greatly improved.

It was also possible to ascertain that, in addition to improving the product homogeneity, also the energy absorption is more reduced.

The invention claimed is:

1. A plasticating screw (1), comprising:
    a shank (2) extending along a rectilinear axis (3),
    a feeding region (4) for supplying a product to be plasticated,
    a plastication region (5) placed immediately downstream of the feeding region (4), relative to a main feeding direction (S) of the product along the axis (3) of the shank (2),
    at least one primary thread (7) extending in a helical development around the shank (2) at least in the plastication region (5), following a predetermined winding direction (V),
    at least one secondary thread (10) extending in a helical development around the shank (2) in the same way as said predetermined winding direction (V), in at least part of the plastication region (5),
    wherein said primary thread (7) and secondary thread (10) each have a varying pitch ($p_1$, $p_2$); the pitch variation ($p_2$) of the secondary thread (10) being greater than the pitch variation ($p_1$) of the primary thread (7),
    wherein the pitch ($p_1$) of the primary thread (7), in at least part of the plastication region (5), increases at each turn carried out by the helical development of the primary thread (7) around the shank (2), away from the feeding region (4),
    wherein the pitch ($p_2$) of the secondary thread (10), in at least part of the plastication region (5), increases at each turn carried out by the helical development of the secondary thread (10) around the shank (2), away from the feeding region (4).

2. A plasticating screw as claimed in claim 1, wherein the pitch ($p_1$) of the primary thread (7) increases at each turn by a constant increase amount.

3. A plasticating screw as claimed in claim 1, wherein the pitch ($p_2$) of the secondary thread (10) increases at each turn by a constant increase amount.

4. A plasticating screw as claimed in claim 1, wherein said primary thread (7) and secondary thread (10) identify, along the shank (2), a primary flowing channel (11) that, taking into account the feeding direction of the product, is bounded upstream by the secondary thread (10) and downstream by the primary thread (7), and a secondary flowing channel (12) bounded upstream by the primary thread (7) and downstream by the secondary thread (10).

5. A plasticating screw as claimed in claim 4, wherein said primary flowing channel (11) and secondary flowing channel (12) each have a varying axial size along the main feeding direction (S) of the product.

6. A plasticating screw as claimed in claim 5, wherein the axial size of the primary flowing channel (11) decreases away from the feeding region (4).

7. A plasticating screw as claimed in claim 5, wherein the axial size of the secondary flowing channel (12) increases away from the feeding region (4).

8. A plasticating screw as claimed in claim 1, wherein the shank (2) has a varying diameter at least at the secondary thread (10).

9. A plasticating screw as claimed in claim 4, wherein said shank (2) has an increasing diameter along the primary flowing channel (11).

10. A plasticating screw as claimed in claim 4, wherein said shank (2) has a constant or decreasing diameter along the secondary flowing channel (12).

11. A plasticating screw as claimed in claim 4, wherein the primary flowing channel (11) has a width progressively decreasing along the feeding direction (S) of the product, and the secondary flowing channel (12) has a width progressively increasing along the feeding direction (S) of the product.

12. A plasticating screw as claimed in claim 1, wherein the secondary thread (10) has a ridge diameter ($d_2$) smaller than the ridge diameter of the primary thread ($d_1$).

13. A plasticating apparatus, comprising:
    a tubular body (14) having an inlet (15) and an outlet (16);
    a plasticating screw (1) as claimed in claim 1, rotatably mounted in the tubular body 14);
    driving means (17) to set the screw (1) in rotation.

* * * * *